United States Patent [19]
Iida

[11] 3,748,028
[45] July 24, 1973

[54] FILM REWIND DEVICE FOR COMPACT CINECAMERAS

[75] Inventor: Yozo Iida, Tokyo, Japan

[73] Assignee: Nippon Kogaku K.K., Tokyo, Japan

[22] Filed: July 20, 1972

[21] Appl. No.: 273,626

Related U.S. Application Data

[63] Continuation-in-part of Ser. No. 91,997, Nov. 23, 1970, Pat. No. 3,689,137.

[52] U.S. Cl. .................... 352/91, 352/172, 352/217
[51] Int. Cl. .......................................... G03b 21/36
[58] Field of Search ................... 352/91, 172, 217

[56] References Cited
UNITED STATES PATENTS
3,689,137   9/1972   Iida ..................................... 352/91
3,692,395   9/1972   Iida ..................................... 352/217

Primary Examiner—Samuel S. Matthews
Assistant Examiner—Russell E. Adams, Jr.
Attorney—Joseph M. Fitzpatrick, John Thomas Cella et al.

[57] ABSTRACT

A film rewind device for compact cinecameras of the type using a film cartridge having no supply spool shaft operable from the exterior thereof but provided with detent means attached to a take-up core, and in which the length of film to be loosely supplied to the take-up chamber of the cartridge can be varied in proportion to the film roll diameter in the supply chamber of the cartridge by the utmost utilization of the fact that the space in each of the supply and take-up chambers varies in proportion to the length of film photographed, and the length of film to be loosely supplied into the take-up chamber can be selected as desired within a predetermined range and that length of film can be rewound exactly.

3 Claims, 13 Drawing Figures

Patented July 24, 1973  3,748,028

Patented July 24, 1973

Patented July 24, 1973

FILM REWIND DEVICE FOR COMPACT CINECAMERAS

BACKGROUND OF THE INVENTION

This is a continuation-in-part of copending application Ser. No. 91,997, filed on Nov. 23, 1970, now U.S. Pat. No. 3,689,137.

FIELD OF THE INVENTION

This invention relates to compact cinecameras, and more particularly to a film rewind device for such cameras.

DESCRIPTION OF THE PRIOR ART

Some of the film cartridges used with cinecameras are provided with detent means disposed in the take-up chamber thereof for preventing slackening of the fed film in the cartridge. In a cinecamera using a film cartridge of such type, the double-exposure technique is adapted and in this connection the film rewind operation is effected by temporarily stopping the take-up of the film so as to store a predetermined length of the fed film in the space within the cartridge and thereafter rewinding that length of film. Such a system can not always ensure an available or sufficient space within the cartridge for that purpose. More specifically, during the initial stage of photographing, space is abundant in the take-up chamber into which the film is supplied loosely with the take-up core being temporarily stopped, whereas space is approximately null in the supply chamber into which the loosely supplied film is to be rewound. During the intermediate stage of photographing, the spaces in the supply and take-up chambers become substantially equal to each other and the length of film to be supplied or the length of film to be rewound becomes greatest at this stage. At the final stage of photographing, the take-up chamber is full of film and no space is available therein.

Attempts have heretofore been made to solve this problem by presetting an unrewindable range for several feet of the film in each of the leading and trailing end portions thereof and a rewindable range for the intermediate position of the film. As a result, the length of film to be rewound has been limited to a predetermined value. An attempt to increase such limited length of film to be rewound has entailed a decrease in the rewindable range, and an attempt to increase the rewindable range has entailed a decrease in the length of film to be rewound.

SUMMARY OF THE INVENTION

It is the object of the present invention to overcome the above-described disadvantages existing in the prior art and provide a film rewind device for cinecameras in which the length of film to be loosely supplied to the take-up chamber of a film cartridge can be varied in proportion to the film roll diameter in the supply chamber of the cartridge by the utmost utilization of the fact that the space in each of the supply and take-up chambers varies in proportion to the length of film photographed. Moreover, in the film rewind device of the present invention, the length of film to be loosely supplied into the take-up chamber can be selected as desired within the possible range determined according to the exposed film as mentioned, and the exact length of film thus loosely supplied can be rewound from the take-up chamber to the supply chamber of the film cartridge.

According to the present invention, in a compact cinecamera using a film cartridge, on a take-up core which is provided with detent means, while there is provided no shaft for a film supply spool, the cinecamera includes a shutter shaft associated at least with drive means for driving shutter means, film supply means and film measuring means, an automatic stop means for automatically stopping normal and reverse rotations of the shutter shaft and provided on the shutter shaft or on an intermediate shaft associated therewith. The improvement comprises: displacing means associated with the film measuring means to be displaced in such a manner that the amount of displacement is zero at the extremities of an indicator scale on the measuring means and that the amount of displacement is greatest in the middle of th indicator scale; first control means associated with the displacing means and displaceable in response to the displacement of the displacing means during normal photographing operation for determining the time for the automatic stop means to automatically stop the normal rotation of the shutter shaft to thereby control the amount of film to be photographed with the film being loosely fed; and second control means displaceable within the amount of displacement of the first control means when the device has been changed over from the normal photographing position to another photographing position for taking continuous shot with the film being loosely fed, the displacement of the second control means determining the time for the automatic stop means to stop the reverse rotation of the shutter shaft to thereby control the amount of film to be rewound.

The above and other features of the present invention will become fully apparent from the following detailed description taken in conjunction with the accompanying drawings.

DESCRIPTION OF THE PREFERRED EMBODIMENTS

Figure 1:
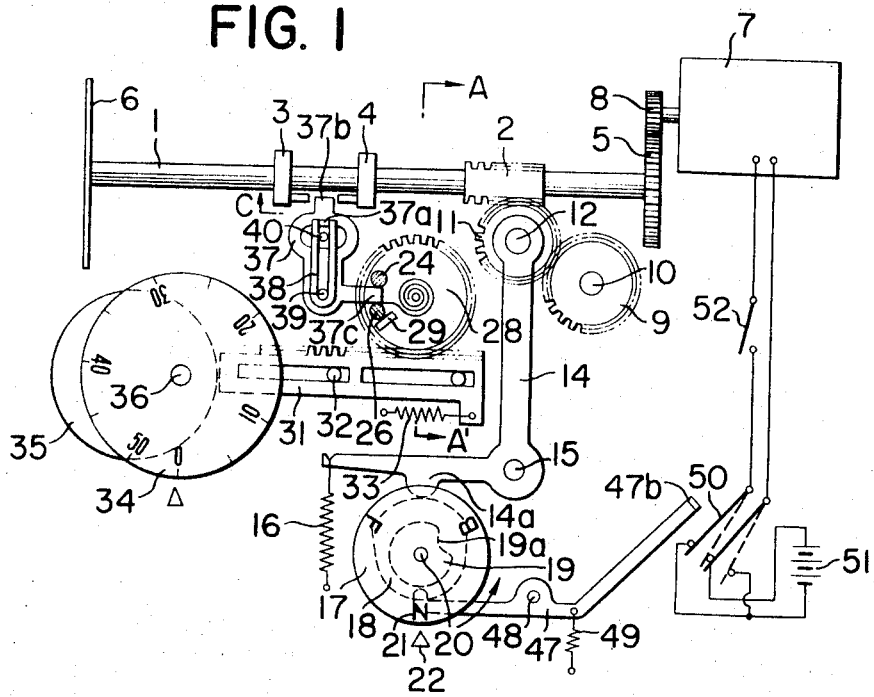
FIG. 1 is a plan view schematically showing the essential parts of the film rewind device embodying the present invention as the device has been set in a position for starting normal photographing.
Figure 5:
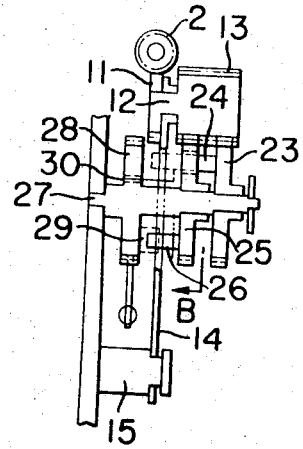
FIG. 5 is a cross-sectional view taken along lines V—V of FIG. 1.

Referring to FIG. 1, a shutter shaft 1 operatively associated with a conventional shutter means (not shown) and with a film feeding pawl 53 (FIG. 9) movable in opposite directions is securely provided with a pin 1', a worm 2, a pair of pawled stop discs 3 and 4, a shutter gear 5 and a sector 6, these being positioned at suitable distances as hereinafter explained. A micromotor 7 has an output shaft connected to the shutter shaft 1 at one end thereof via pinion 8 and shutter gear 5. The micromotor 7 is a reversible motor energized through a change-over switch 50 for changing the rotational direction of the motor to be described and thereby the shutter shaft 1 is driven to rotate in normal or reverse directions. A film take-up gear 9 is engaged with a take-up shaft 56 (FIG. 9, the manner of this engagement is not shown) which is enclosed in a conventional film cartridge having no rewind spool shaft but provided with detent means for preventing the film slack. The film take-up gear 9 is mounted on a shaft 10 journalled to the body of a camera and is engageable with a clutch gear 11 formed of a thin spur gear and serving also as a worm wheel, so that the gear 9 is driven to rotate by the clutch gear 11. As shown in FIG. 5, the clutch gear 11 is rotatably mounted on a shaft 12 together with an integral gear 13 in such a manner that an inverted L-shaped clutch lever 14 is sandwiched at the upper end thereof between the clutch gear 11 and the integral gear 13. The clutch gear 11 is in engagement with the worm 2 seated on the shutter shaft 1. The clutch lever 14 is pivotally mounted on a pin 15 secured to the camera body and is biased by a compression spring 16 so that a projection 14a formed in one arm of the clutch lever 14 is urged into contact with a clutch cam 18. The clutch cam 18 is mounted rotatably on a shaft 20 which is manually operated by a knob 17 formed integrally therewith. The operating knob 17 has a switch cam 19 integral therewith which will be described later in detail. The operating knob 17 is provided with markings 21 including letters B, F and N formed at predetermined positions therein, which markings cooperate with an index 22 formed in the camera body. The clutch cam 18 is designed to selectively displace the clutch lever 14 so that the take-up gear 9 is engaged with the clutch gear 11 when the letter N of the marking 21 is registered with the index 22 and that the gear 13 (FIG. 5) is engaged with counter gears 23 and 25 to be described when the letter F or B of the marking 21 is registered with the index 22.

Figure 4:
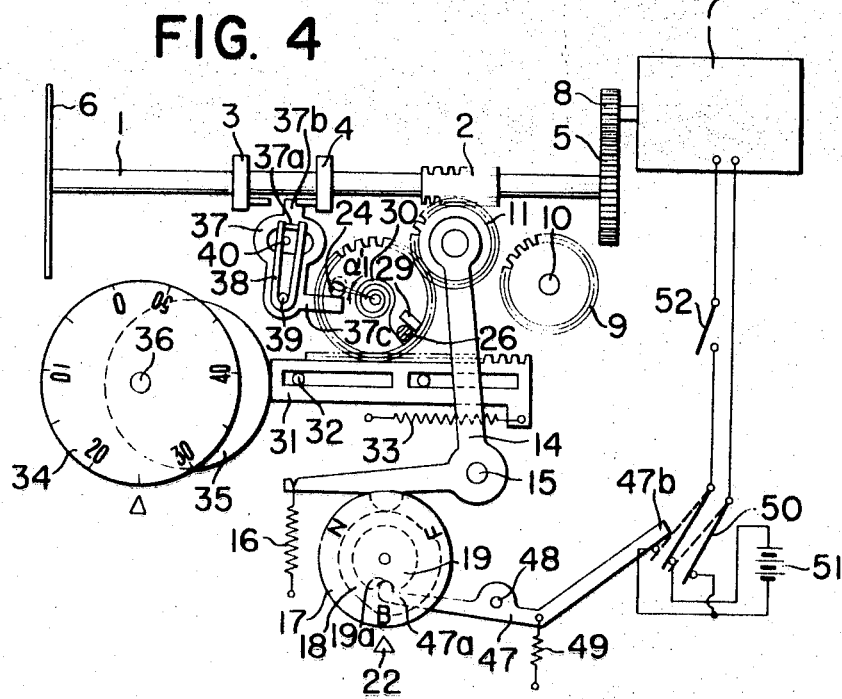
FIG. 4 is a plan view also similar to FIG. 1 but showing the device as it is rewound from the position of FIG. 3.
Figure 6:
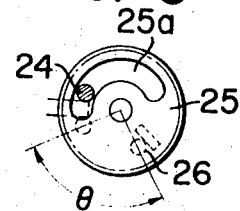
FIG. 6 is a partly sectional view taken along line VI of FIG. 5.

In FIG. 5, the counter gears 23 and 25 are rotatably mounted on a common shaft 27 which is rotatably journalled to the camera body and integral with a detector gear 28 having a projection 29 for engaging a rack 31 to vary the amount of film to be rewound. The counter gear 23 has a pin 24 studded therein and extending through an elongated actuate slot 25a formed in the counter gear 25, as shown in FIG. 6. The pin 24 is adapted to actuate a stop pawl 37, which will be described later, when the knob 17 is rotated until the mark B thereon is registered with the index 22 as shown in FIG. 4. The counter gear 25 is further formed with a pin 26 radially opposite to the slot 25a. The pin 26 is urged into contact wth the projection 29 formed axially on a detector gear 28, to be described below, when the counter gear 25 is disengaged from the gear 13 integral with the clutch gear 11.

The counter gear 25 and its pin 26 together constitute first control means, and the counter gear 23 and its pin 24 together constitute second control means.

The rack 31 always engages with the detector gear 28 receives guide pins 32 in the guide slots formed therein and is biased by a tension spring 33 into engagement with a cam 35 which is rotated by the shutter shaft 1 through an unshown interlocking member connected opratively to a shaft 36 of a film measuring disc 34. The cam 35 is so arranged that the cam movement caused thereby may be transmitted to the projection 29 of the detector 28 via the rack 31 so as to enable the film to be taken-up or rewound in accordance with the length thereof to be photographed, and that the amount of displacement of the cam 35 may be zero at the extremities of the scale graduated on the film measuring disc 34, but maximum in the middle of the scale.

The detector gear 28, projection 29, shaft 27, rack 31, guide pins 32, spring 33 and cam 35 together constitute displacing means.

A stop member 37 having a projection 37a vertically formed thereon and a longitudinally projected top end 37b is pivotally mounted on the camera body by means of a pin 39. A U-shaped spring 38 is secured to the shaft 39 and a pin 40 studded in the camera body in such a manner that the upper ends of the U-shaped spring 38 resiliently holds therebetween the projection 37a of the stop member 37. Thus, the stop member 37 is resiliently held by the U-shaped spring 38 so that the projected top end 37b is disposed between the pawl stops of the discs 3 and 4. The stop member 37 further includes a lower lateral projection 37c corresponding to the pins 24 and 26 studded in the counter gears 23 and 25.

Figure 7:
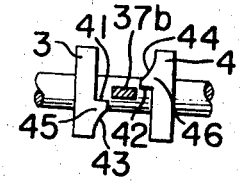
FIG. 7 is a partly sectional view taken along line VII of FIG. 1.

Referring now to FIG. 7, the pawled stop discs 3 and 4 are shown in detail. These stop discs 3 and 4 are formed with shoulders 41 and 42 and slant cam surfaces 43 and 44, respectively. The shoulder 41 and cam surface 43 of the stop disc 3 together form an axial pawl member 45, and the shoulder 42 and cam surface 44 of the other disc 4 together form an axial pawl member 46. The shoulders 41 and 42 are slightly spaced with respect to the projected top end 37b of the stop member 37 so as not to interfere therewith. The shoulders 41 and 42 are set in such an angular relation that the position in which they are brought into abutment with the projected top end 37b of the stop member 37 when they are stopped out of a possible take-up or rewind range or automatically stopped in accordance with a length of film photographed during a first shot, as described later, is the same as the position in which they are stopped by an unshown pawl for stopping the shutter shaft.

The switch cam 19 integral with the operating knob 17 has a recess 19a for receiving the left end projection 47a of a switch lever 47 when the mark B of the knob 17 is registered with the index 22. The switch lever 47 is pivotally mounted on a shaft 48 secured to the camera body and is biased by a tension spring 49 so that the projection 47a thereof is normally urged into contact with the switch cam 19, and that when the left end 47a is received in the recess 19a, the right end 47b actuates a change-over switch 50 into a position for establishing a reverse drive circuit.

A power supply battery 51 and a switch 52 associated with the micromotor 7 and unshown shutter button constitute a change-over circuit for driving the shutter shaft 1 to rotate in normal and reverse directions.

Figure 9:
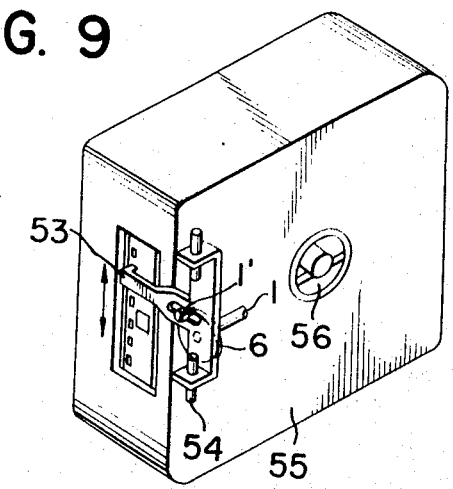
FIG. 9 is a perspective view for illustrating the relationship between the film cartridge and the film feeding means.

As shown in FIG. 9, film supply pawl means 53 is provided slidably on the shafts 54 and formed with a slot to receive the eccentric pin 1' integrally adapted to the disc 6 eccentrically with the center thereof, thus the film being moved in normal or reverse directions. Film cartridge 55 of the known type encloses therein a take-up core 56 provided with means for preventing the film slack.

Figure 2:
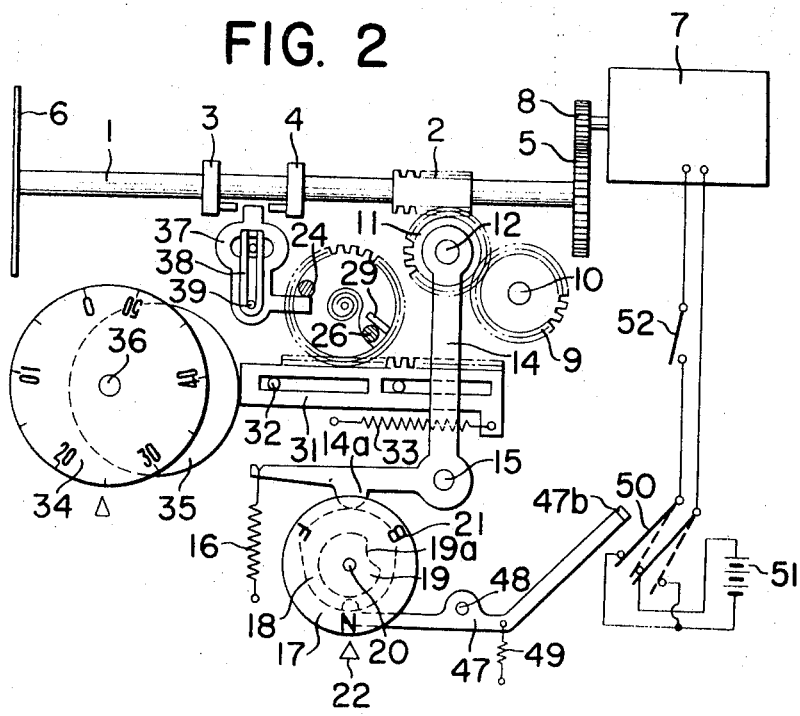
FIG. 2 is a plan view similar to FIG. 1 but showing the device as it is in a position where photographing is progressed to a certain degree.
Figure 3:
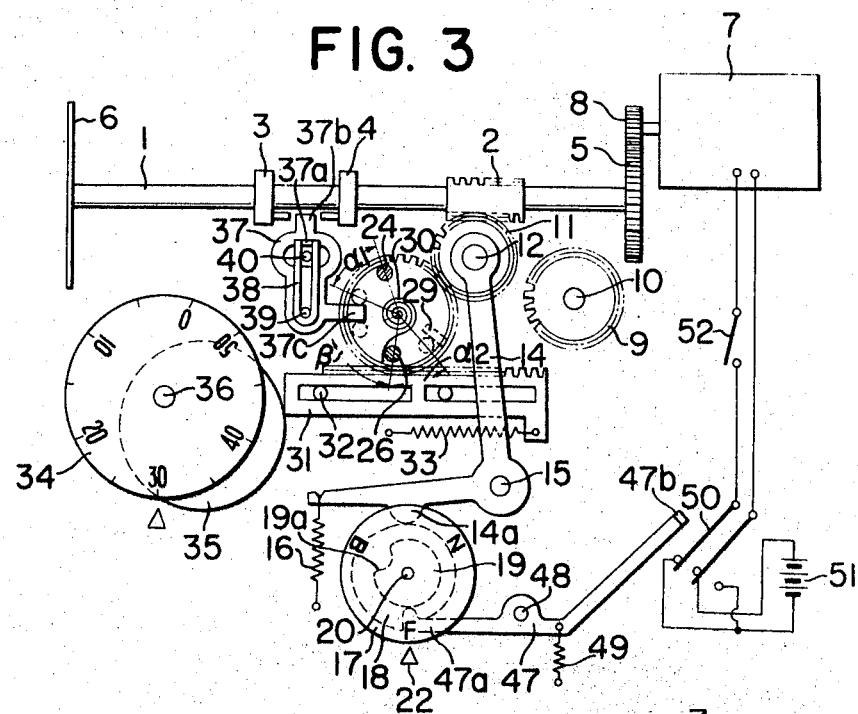
FIG. 3 is a plan view again similar to FIG. 1 but showing the device as it is changed over from the position of FIG. 2 to a position for effecting continuous shot while loosely supplying a film into the take-up chamber by temporally stopping the film take-up operation.

In operation, the operating knob 17 is manually rotated until the mark N thereof is registered with the index 22 as shown in FIG. 1 or 2. The shutter button (not shown) is operated to close the switch 52, whereby a normal drive circuit is established and the micromotor 7 is thereby rotated in normal direction. Thus, the shutter shaft 1 is also driven to rotate in normal direction by the micromotor 7 via pinion 8 and shutter gear 5, so that the feeding pawl 53 associated with the shutter shaft 1 feeds the film in normal direction. At the same time, the take-up gear 9 is driven through worm 2 and clutch gear 11 so that the film is taken up by the take-up shaft 56 adapted within the film cartridge. Thus, normal shot may be effected. Concurrently therewith, the film measuring disc 34 is driven to rotate by the shutter shaft 1 via an interlocking member (not shown) to thereby indicate the length of film photographed, and the cam 35 integral with the film measuring disc 34 is also rotated to displace the rack 31, whose displacement is converted through the projection 29 of the detector gear 28 into a possible take-up or rewind range as indicated by $\theta$ (FIG. 6) corresponding to the length of film photographed (FIG. 2). Subsequently, the operating knob 17 is further rotated without interrupting the described shutter operation until the mark F of the knob 17 is registered with the index 22, whereby the clutch lever 14 is rotated counter-clockwise by the clutch cam 18 to disengage the clutch gear 11 from the take-up gear 9 and the gear 13 integral with the clutch gear 11 is engaged with the counter gears 23 and 25 (FIG. 3). In this position, the change-over switch 50 remains closed to maintain the normal drive circuit so as to allow the photographing operation to continue, and the rotation of the shutter shaft 1 causes the rotation of the counter gears 23 and 25 instead of the take-up gear 9, so that the pins 24 and 26 of the respective counter gears 23 and 25 move away from their respective associated projections 37c and 29, i.e., in the direction for increasing the values $\alpha_1$ and $\alpha_2$ in FIG. 3. Thus, the rotation of the take-up gear 9 is stopped and hence the film transported in normal direction by the film feeding pawl (FIG. 9) is loosely stored in the film cartridge without being taken up by the take-up shaft 56 therein. The length of film thus stored in the film cartridge corresponds to an angle which is within the possible take-up or rewind range $\theta$ shown in FIG. 6. When the shutter is released at a desired angular point $\alpha_2$ within the possible range $\theta$, the shutter shaft 1 and therefore the pawled stop discs 3, 4 are stopped at a predetermined position by unshown shutter stop member while leaving an available range $\beta$, and thus the film transportation is also stopped. On the other hand, the pin 24 is spaced apart from the projection 37c by an angular distance corresponding to $\alpha_2$, i.e., $\alpha_1$.

When it is desired to release the shutter at the maximum possible take-up or rewind range, that is to say, when it is desired to take the angle $\alpha_2$ as large as possible within the possible range $\theta$, the shutter release operation may be continued until the studded pin 26 of the counter tear 25 strikes the projections 37c of the stop member 37 as to displace the projected top end 37b of the stop member 37 toward the pawled stop disc 3 against the action of the U-shaped spring 38. Thus, the shoulder 41 of the pawled stop disc 3 (FIG. 7) interferes with the top end 37b of the stop member 37, whereby the rotation of the shutter shaft 1 is automatically stopped and the film transportation is also stopped. At the same time, the pin 24 studded in the counter gear 23 is displaced by the same amount.

Subsequently, light entering through a photographing lens (not shown) is interrupted in the known manner, whereafter the operating knob 17 is rotated until mark B thereon is registered with the index 22 as shown in FIG. 4. Thus, the clutch lever 14 is stopped at its counter-clockwise rotated position by the clutch cam 18, and the gear 13 integral with the clutch gear 11 maintains its engagement with the counter gears 23 and 25, whereby the change-over switch 50 is changed over to establish a reverse drive circuit by the switch cam 19 via switch lever 47. In this position, if the shutter button is released, the micromotor 7 will be revolved in reverse direction and accordingly all the parts associated therewith will also be driven in reverse direction, whereby the amount of film loosely stored in the take-up chamber in the film cartridge may be reversely transported to return to the supply chamber. Simultaneously therewith, the counter gears 23 and 25 are also rotated in reverse direction so that the pin 24 of the counter gear 23 urges the projection 37c of the stop member 37 downwardly to thereby displace the top end 37b of the stop member 37 toward the pawled stop disc 4 against the action of the U-shaped spring 38. Thus, the shoulder 42 of the pawl member 46 in the stop disc 4 interferes with the top top end 37b of the stop member 37, whereby the reverse rotation of the shutter shaft 1 and accordingly the reverse movement of the film are stopped automatically.

In FIG. 4, $\alpha'_1$ represents the angle over which the pin 24 of the counter gear 23 is rotated from the time when the top end 37b of the stop member 37 is interfered with the should 42 of the stop disc 4 till the reverse rotation is automatically stopped. Such angle of rotation $\alpha'_1$ can be approximate to zero by suitably increasing the dimensional ratio of the top end 37b to the lower lateral projection 37c of the stop member 37.

Subsequently, when the operating knob 17 is again rotated until the mark N is registered with the index 22, the switch lever 47 is rotated counter-clockwise by the switch cam 19 against the action of the spring 49 while the clutch lever 14 is rotated clockwise by the clutch cam 18 against the action of the spring 16, to thereby bring the device into the position ready for effecting normal shot. Thus, the change-over switch 50 is returned to the normal drive position and the gear 13 is disengaged from the counter gears 23 and 25, while the clutch gear 11 is engaged with the take-up gear 9. Thus, the counter gears 23 and 25 are returned to their predetermined positions with the aid of pins 24 and 26, U-shaped spring 38, spiral spring 30, and pawls 45 and 46. At the same time, the stop member 37 is returned by the urge of the U-shaped spring 38 to its normal position where the stop member 37 is not interfered with by any of the pawls 45 and 46 of the stop discs 3 and 4. If the shutter button is actuated in this state, there will be acccomplished a double shot.

Figure 8:
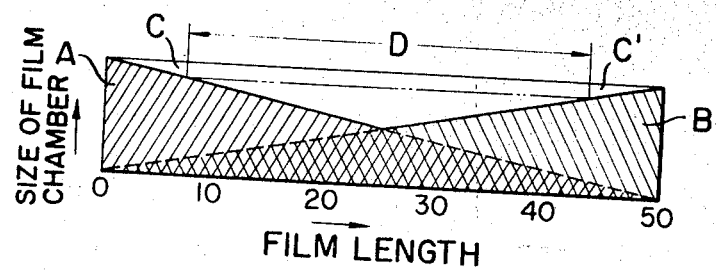
FIG. 8 is a graphical representation for illustrating the relationship between the film roll diameter and the space in each of supply and take-up chambers in a film cartridge used with the present invention.

Referring to FIG. 8, relations between the dimensions of the film chambers and the length of the film therein are graphically shown with the film roll diameters and the spaces in the supply and take-up chambers in the film magazine overlapping each other. The upper triangle defined by the leftwardly downward diagonal represents the space in the take-up chamber, and the upper triangle defined by the rightwardly downward diagonal represents the space in the supply chamber. The triangle A shown with hatching designates the film roll diameter in the supply chamber, and the other triangle B shown with hatching represents the film roll diameter in the supply chamber.

C–C' represents the range over which the film can be loosely fed and rewound. As seen, such range is gradually increased from the initial stage of photographing and reaches a peak in the middle stage, whereafter it is gradually decreased toward the termination of photographing. Letter D represents the possible film take-up or rewind range according to the prior art.

It will thus be noted that according to the present invention, the fact that the space in each of the supply and take-up chambers of the film cartridge varies in proportion to the length of film photographed is utilized to the utmost so that the length of film to be loosely fed into the take-up chamber of the film cartridge can be varied in proportion to the length of film photographed. Moreover, the length of film to be loosely fed can be selected as desired within a predetermined range, and the exact length of film thus loosely fed into the take-up chamber can be rewound into the supply chamber.

Figure 10:
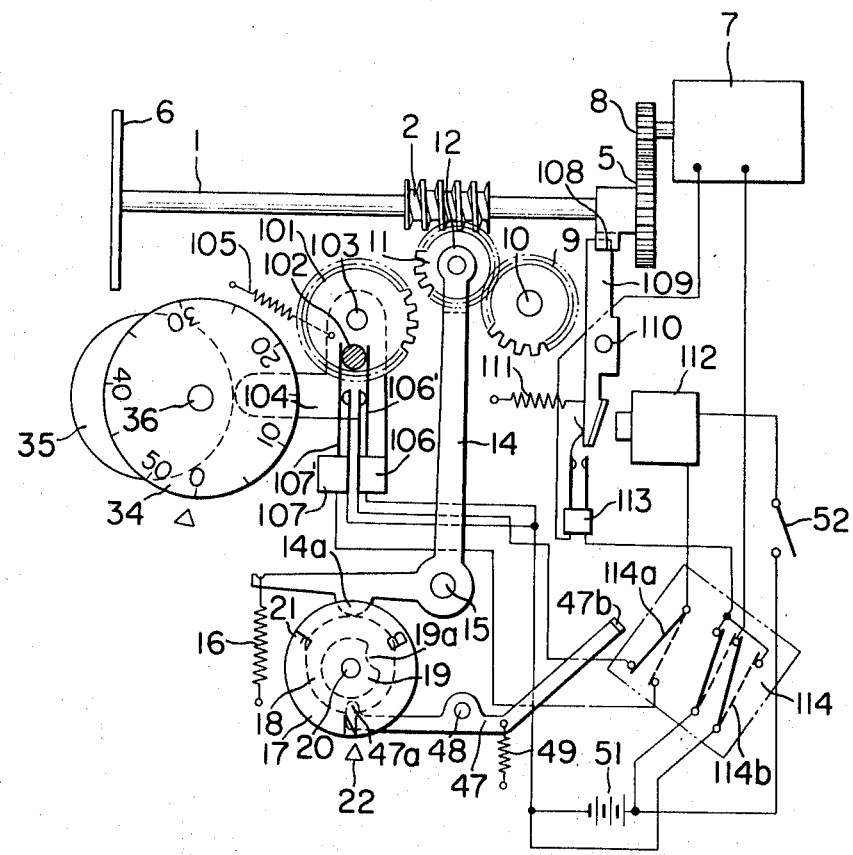
FIG. 10 is a plan view substantially showing the essential parts of the film rewind device embodying the invention and including modifications over the device of FIG. 1.
Figure 11:
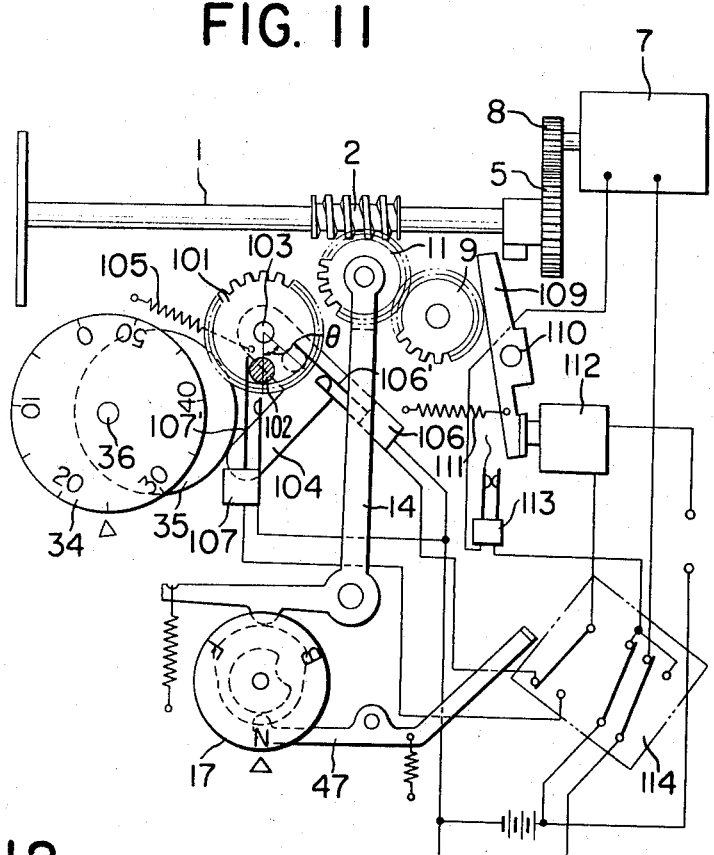
FIG. 11 is a plan view illustrating a different operational state of the device of FIG. 10.
Figure 12:
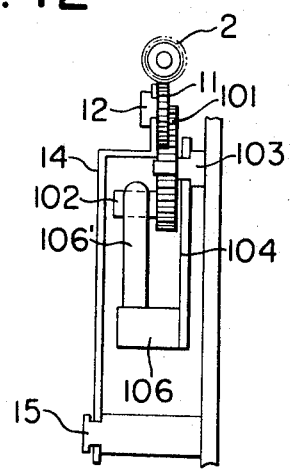
FIGS. 12 and 13 illustrate details of the device shown in FIG. 10.

FIGS. 10 to 13 show another embodiment of the present invention in which a shutter shaft 1, operatively associated with a conventional shutter means and with a film feeding pawl 53 (FIG. 9) movable in opposite directions, is securely provided with a worm 2, a shutter gear 5 and a sector 6. A micromotor 7 has its output shaft connected to the shutter shaft 1 via a pinion 8 mounted thereon and said shutter gear 5. The micromotor 7 is a reversible motor energized through a chang-over switch 114b for changing the rotational direction of the motor, as will be described, to thereby drive the shutter shaft 1 in normal or reverse directions. A film take-up gear 9 is engaged with a take-up shaft 56 which is enclosed in a conventional film cartridge having no rewind spool shaft but having a take-up core provided with detent means for preventing the slackening in the film. The film take-up gear 9 is mounted on a shaft 10 journalled to the camera body and is engageable with a clutch gear 11 formed of a thin spur gear and also serving as a worm wheel, so that the gear 9 is driven to rotate by the clutch gear 11. As shown in FIG. 12, the clutch gear 11 is rotatably mounted on a shaft 12 carried by an inverted L-shaped clutch lever 14 and is in engagement with the worm 2. The clutch lever 14 is pivotally mounted on a pin 15 secured to the camera body and is biased by a compression spring 16 so that a projection 14a formed in one arm of the clutch lever 14 is urged into contact with a clutch cam 18. The clutch cam 18 is rotatably mounted on a shaft 20 which is manually operated by a knob 17 formed integrally therewith. The operating knob 17 is provided with markings 21 including letters B, F and N formed at predetermined positions therein. The markings cooperate with an index 22 formed in the camera body. The clutch cam 18 is designed to selectively displace the clutch lever 14 so that the take-up gear 9 is engaged with the clutch gear 11 when the letter N of the markings 21 is registered with the index 22 and that the gear 11 is engaged with a counter gear 101 to be described when the letter F or B of the markings 21 is registered with the index 22.

The counter gear 101 is rotatably mounted on a shaft 103 which is rotatably journalled to the camera body and is integral with a detection lever 104 having a contact 106 for engaging a cam 35 to vary the amount of film to be rewound. The counter gear 101 has a pin 102 studded therein and adapted to actuate a normal rotation stop switch 106 so that film is advanced by an amount necessary to effect a first exposure when the letter F of the markings 21 is registered with the index 22, i.e., when the clutch gear 11 is disengaged from the take-up gear 9 to stop the gear 9 from rotating, and also adapted to actuate a reverse rotation stop switch 107 so that film is rewound by the same amount when the letter B of the markings 21 is registered with the index 22. When a position is reached other than the position in which film take-up and rewind can smoothly take place, the pin 102 actuates the stop switches 106 and 107 to stop the rotation of the shutter shaft 1.

The normal rotation stop switch 106 and the pin 102 together constitute first control means, and the reverse rotation stop switch 107 and the pin 102 together constitute second control means.

The detection lever 104 is always biased by a tension spring 105 into engagement with a cam 35 which is rotated by the shaft 1 through an interlocking member (not shown) connected operatively to a shaft 36 of a film measuring disc 34. The cam 35 is so arranged that the cam movement caused thereby may be transmitted to the normal rotation stop switch 106 of the detection lever 104 so as to enable the film to be taken up or rewound in accordance with the length thereof to be photographed, and that the amount of displacement of the cam 35 may be zero at the extremities of the scale graduated on the film measuring disc 34, but maximum in the middle of the scale.

The detection lever 104, normal rotation stop switch 106, shaft 103, tension spring 105 and cam 35 together constitute displacing means.

Figure 13:
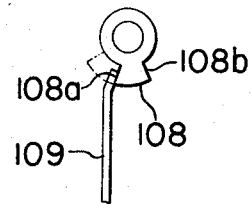

The reverse rotation stop switch 107 is securely mounted on the camera body and has one contact 107' thereof disposed in the circular path of the studded pin 102 on the counter gear 101 so that the switch 107 is opened and closed by the pin 102. The reverse rotation stop switch 107 is so designed that it is operated only when the letter B on the knob 17 is registered with the index 22, i.e., when the change-over switch 114, to be described, is changed over to its reverse position. Similarly, the normal rotation stop switch 106 is securely mounted on the camera body and has one contact 106' thereof disposed in the circular path of the studded pin 102 on the counter gear 101. The normal rotation stop switch 106 is so designed that its amount of displacement, i.e., the maximum amount of film which can be loosely stored in a film cartridge, may be determined by the pin 102 and the contact 106' of the switch 106. Projection 108 is formed to stop the shutter integral with the shutter gear 5. As shown in FIG. 13, the projection 108 includes a portion 108a for stopping the reverse rotation of the shutter. A shutter shaft stop member 109 is pivotally mounted on a shaft 110 secured to the camera body, and it is biased by a spring 111 so that one end thereof is engaged with the projection 108. A motor switch 113 is provided and designed to close a motor circuit when the shutter stop member 109 is disengaged from the projection 108. A change-over switch, generally designated by 114, may be changed over between a normal drive position and a reverse drive position by a switch lever 47, and it includes a switch 114a for selectively operating the normal rotation stop switch 106 and the reverse rotation stop switch 107. The switch 114a is such that in its full-line position of FIG. 10 it operates only the normal rotation stop switch 106 and in its broken-line position it operates only the reverse rotation stop switch 107.

The switch cam 19 integral with the operating knob 17 has a recess 19a for receiving the left end projection 47a of a switch lever 47 when the mark B of the knob 17 is registered with the index 22. The switch lever 47 is pivotally mounted on a shaft 48 secured to the camera body and is biased by a tension spring 49 so that the projection 47a thereof is normally urged into contact with the switch cam 19, and that when the left end 47a is received in the recess 19a, the right end 47b actuates the change-over switch 114 into a position for establishing a reverse drive circuit. A power supply battery 51, change-over switch 114, and a switch 52 associated with the micromotor 7 and a shutter button (not shown) constitute a series of circuits.

Operation of the present embodiment will now be described. As shown in FIGS. 10 and 11, the operating knob 17 is manually rotated until the mark N thereof is registered with the index 22. The shutter button (not shown) is operated to close the switch 52, whereby a normal drive circuit is established and the micromotor 7 is thereby rotated in the normal direction. Thus, the shutter shaft 1 is also driven to rotate in the normal direction by the micromotor 7 via pinion 8 and shutter gear 5, so that the feeding pawl 53 associated with the shutter shaft 1 feeds the film in the normal direction. At the same time, the take-up gear 9 is driven through worm 2 and clutch gear 11 so that the film is taken up by the take-up shaft 56 adapted within the film cartridge. Concurrently therewith, the film measuring disc 34 is driven to rotate by the shutter shaft 1 via the interlocking member to thereby indicate the length of film photographed, and the cam 35 integral with the film measuring disc 34 is also rotated to displace the detection lever 104, whose displacement is converted through the contact 106' of the normal rotation stop switch 106 into a possible take-up or rewind range as indicated by θ (FIG. 11) corresponding to the length of film photographed. Subsequently, the operating knob 17 is further rotated without interrupting the described shutter release operation until the mark F of the knob 17 is registered with the index 22, whereby the clutch lever 14 is rotated counter-clockwise by the clutch cam 18 to disengage the clutch gear 11 from the take-up gear 9 and the clutch gear 11 is engaged with the counter gear 101. In this position, the change-over switch 114b remains closed to maintain the normal drive circuit (full-line position in FIG. 10) so as to allow the photocopying operation to continue, and the rotation of the shutter shaft 1 causes the rotation of the counter gear 101 instead of the film take-up gear 9, so that the studded pin 102 is rotated away from the contact 107' of the reverse rotation stop switch 107. Hence, the film transported in normal direction by the film feeding pawl 53 is loosely stored in the film cartridge without being taken up by the take-up shaft 56 therein. The length of film thus stored in the film cartridge corresponds to an angle which is within the possible take-up or rewind range θ, the shutter shaft is stopped at a predetermined position by the shutter stop member 109 while leaving an available range, and thus the film transportation is also stopped.

When it is desired to release the shutter at the maximum possible take-up or rewind range, the shutter release operation may be continued until the studded pin 102 on the counter gear 101 strikes the contact 106' of the normal rotation stop switch 106 so as to open the magnet circuit, whereupon the magnet 112 is deenergized to allow the shutter stop member 109 to be pulled by the spring 111 so that the upper end of the stop member 109 is engaged with the projection 108a of the shutter shaft. Thus, the rotation of the shutter shaft 1 is automatically stopped and accordingly the transportation of the film is also stopped. When the operating knob 17 is rotated until mark B thereon is registered with the index 22, the clutch lever 14 is stopped at its aforesaid position by the clutch cam 18, and the clutch gear 11 maintains its engagement with the counter gear 101, whereby the change-over switch 114b is changed over to establish a reverse drive circuit by the switch cam 19 via switch lever 47. In this position, if the shutter button is released, the micromotor 7 will be revolved in the reverse direction by the action of the magnet 112 and accordingly all the parts associated therewith will also be driven in the reverse direction, whereby the amount of film loosely stored in the take-up chamber in the film cartridge may be reversely transported to return to the supply chamber. Simultaneously therewith, the counter gear 101 is also rotated in reverse direction so that the studded pin 102 actuates the contact 107' of the reverse rotation stop switch 107 to open the magnet circuit so as to allow the shutter stop member 109 to be biased by the spring 11. Thus, the stop member 109 interferes with the portion 108b of the projection 108 of the shutter shaft, whereby the reverse rotation of the shutter shaft 1 and accordingly the reverse movement of the film is stopped automatically.

Subsequently, when the operating knob 17 is again rotated until the mark N is registered with the index 22, the switch lever 47 is rotated counter-clockwise by the switch cam 19 against the action of the spring 49 while the clutch lever 14 is rotated clockwise by the clutch cam 18 against the action of the spring 16, to thereby bring the device into the position ready for effecting normal shot. Thus, the change-over switch 114b is returned to the normal drive position, the gear 13 is disengaged from the counter gear 101, while the clutch gear 11 is engaged with the take-up gear 9, and the counter gear 101 is restored to its original position. If the shutter button is actuated in this state, there will be accomplished a double exposure.

What is claimed is:

1. In a cinecamera of the type using a film cartridge equipped with anti-reversing means attached to a shaft for taking up the film, and including
    a driving shaft, shutter means operable by said driving shaft;
    driving means for normally and reversely rotating the driving shaft;
    means for transporting the film, associated with said driving shaft; and
    means for preventing the rotation of the take-up shaft while said film transporting means is operated to loosely feed the film into a take-up chamber in the film cartridge and loosely rewind the loosely fed film into a supply chamber in said cartridge;
    the improvement comprising
    means for automatically stopping the normal and the reverse rotation of the driving shaft;
    means for determining the maximum amount of the film which is loosely fed into the take-up chamber and then rewound into said supply chamber;
    said determining means being associated with the driving shaft to vary said maximum amount in accordance with the amount of film wound on the take-up shaft;
    first means for operating the automatic stopping means to stop the normal rotation of the driving shaft when the film is loosely fed by the maximum amount into the take-up chamber; and
    second means for operating said automatic stopping means to stop the reverse rotation of the driving shaft when the film is loosely rewound into the supply chamber by the same length as that of the film loosely fed into the take-up chamber;
    said automatic stopping means including a disc securely mounted on said driving shaft, a stop member engageable with said disc and mounted for movement between a first position in which said disc is disengaged therefrom to permit the rotation of the driving shaft and a second position in which said disc is engaged therewith to stop the normal and reverse rotation of said driving shaft, and means for biasing said stop member into said first position thereof.

2. A cinecamera as defined in claim 1, wherein said determining means comprises a cam member movable in association with the driving shaft, and a cam follower biased into contact with the cam member and movable between a first position and a second position, wherein said cam member is mounted for displacing the cam follower from its said first position to its said second position thereof while the film is wound on the take-up shaft from the first extremity to the middle thereof and from its said second position to its said first position while the film is wound from the middle to the last extremity thereof; and wherein
    said first operating means comprises an electrical magnet mounted to move said stop member; an electrical circuit for energizing said magnet to displace the stop member from its said first position to its said second position and for deenergizing said magnet to displace the stop member from its said second position to its said first position; a first switch connected in the circuit and fixedly secured on said cam follower, said first switch being closed when the driving shaft is normally rotated, and said magnet being energized when the first switch is closed and deenergized when the first switch is opened; a first counter member coupled with the driving shaft when said transporting means is operated to loosely feed the film into the take-up chamber and loosely rewind the loosely fed film into the supply chamber; and a pin provided on the first counter member, said first counter member being positioned for the pin thereon to close the first switch when the cam follower is in its said first position, and to open the first switch which is in the displaced position together with the cam follower to thereby stop the normal rotation of said driving shaft when said maximum amount of the film is loosely fed into the take-up chamber.

3. A cinecamera as defined in claim 2, wherein said second operating means comprises said first counter member, said pin provided on the first counter member, and a second switch connected in parallel with the first switch and fixedly mounted on the body of the cinecamera for engagement by said pin when both said first switch and cam follower are in their respective first positions, said second switch being closed when the driving shaft is reversely rotated and opened during the engagement of the pin therewith, whereby the pin opens the second switch to thereby stop the reverse rotation of said driving shaft when the film is loosely rewound into the supply chamber by the same amount as that of the film loosely fed into the take-up chamber.

* * * * *